United States Patent [19]

Cichelli et al.

[11] 4,429,385

[45] Jan. 31, 1984

[54] METHOD AND APPARATUS FOR DIGITAL SERIAL SCANNING WITH HIERARCHICAL AND RELATIONAL ACCESS

[75] Inventors: Richard J. Cichelli, Allentown; Michael O. Thompson, Bethlehem, both of Pa.

[73] Assignee: American Newspaper Publishers Association, Washington, D.C.

[21] Appl. No.: 336,224

[22] Filed: Dec. 31, 1981

[51] Int. Cl.³ .......................... H04J 3/00; H04N 7/08
[52] U.S. Cl. .................................... 370/92; 358/146; 364/900; 340/825.52
[58] Field of Search ............... 370/85, 92, 94; 340/825.07, 825.52, 825.53; 364/200 MS File, 900 MS File; 340/146.3 Q, 146.3 Z; 358/142, 146, 147; 455/3

[56] References Cited

U.S. PATENT DOCUMENTS

| | | | |
|---|---|---|---|
| 3,214,736 | 10/1965 | Glaser | |
| 3,827,026 | 7/1974 | Viswanathan | 340/167 A |
| 3,840,811 | 10/1974 | Blouch | |
| 3,860,745 | 1/1975 | Takada | |
| 3,927,250 | 12/1975 | Rainger | |
| 3,947,972 | 4/1976 | Freeman | |
| 3,986,208 | 10/1976 | Sykes | 360/49 |
| 4,006,465 | 2/1977 | Cross et al. | |
| 4,028,733 | 6/1977 | Ulicki | 360/10 |
| 4,032,972 | 6/1977 | Saylor | 358/142 |
| 4,044,380 | 8/1977 | Justice et al. | 358/142 |
| 4,054,911 | 10/1977 | Fletcher et al. | 358/141 |
| 4,078,316 | 3/1978 | Freeman | |
| 4,115,662 | 9/1978 | Guinet et al. | |
| 4,120,003 | 10/1978 | Mitchell et al. | 358/142 |
| 4,131,881 | 12/1978 | Robinson | 340/825.53 |
| 4,167,759 | 9/1979 | Tachi | 360/14 |
| 4,186,413 | 1/1980 | Mortimer | 358/146 |
| 4,205,343 | 5/1980 | Barrett | 358/147 |
| 4,213,124 | 7/1980 | Barda et al. | 340/706 |
| 4,225,752 | 9/1980 | Looschen | 370/1 |
| 4,233,628 | 11/1980 | Ciciora | 358/147 |
| 4,264,925 | 4/1981 | Freeman et al. | 358/86 |
| 4,267,568 | 5/1981 | Dechant et al. | 364/200 |
| 4,286,320 | 8/1981 | Ott | 364/200 |
| 4,291,198 | 9/1981 | Anderson et al. | 179/18 B |
| 4,298,928 | 11/1981 | Etoh et al. | 364/200 |
| 4,305,101 | 12/1981 | Yarbrough et al. | 360/69 |
| 4,308,558 | 12/1981 | Hernandez et al. | 358/142 |
| 4,317,132 | 2/1982 | Guinet | 358/142 |
| 4,337,483 | 6/1982 | Guillon | 358/147 |
| 4,361,848 | 11/1982 | Poignet et al. | 358/146 |

OTHER PUBLICATIONS

McKenzie—"Oracle—An Information Broadcasting Service Using Data Transmission in the Vertical Interval," Journal of SMPTE, vol. 83, Jan. 74.

Edwardson et al., "Ceefax: A Proposed New Broadcasting Service," Journal of SMPTE, vol. 83, Jan. 74, pp. 14–19.

Guinet, "New Services Offered Through Data Pack Broadcasting System," U.E.R. Technique, No. 149, Feb. 1975.

Alexander, "Viedata and Teletext: New Electronic Home Information Delivery Systems," The Seybold Report, vol. 10, No. 6, Nov. 24, 80.

Mello, "A Shaky Start for Electronic Newspapers," Microcomputing Industry, Oct. 81, pp. 1, 14, 16.

*Primary Examiner*—Gerald L. Brigance
*Attorney, Agent, or Firm*—David H. Semmes; Warren E. Olsen

[57] ABSTRACT

Digitally encoded data such as classified advertising and other data bases of similarly related messages are broadcast on a serial-type digital data transmission system. Each message is preceded by a headnote, structured so that upon reception, the receiver can select messages based upon a combination of hierarchical and relational views of the message data, without any interaction whatsoever with the broadcast system.

"Hierarchical access" means that messages are considered in categories and sub-categories. "Relational access" means that within sub-categories access is possible by a combination of attributes or keywords (i.e. using "and", "or", and "not" to combine multiple key phrases).

We call the invention ReQueSt-DB. The name is derived from "Relational Queries on Sequential Data Bases". ReQueSt-DB allows rapid and facile access to one-way, cyclically broadcast, bit serial, sequential data bases consisting of (possibly) many thousands of messages with high selectivity.

In the content of a particular broadcast data base (i.e. one in which part of the data base is classified advertising), a ReQueSt-DB query might be the logical equivalent of "Show me on my television screen the set of classified, real estate ads which describe houses for sale in the Lehigh Valley, Pennsylvania, which are in either Allentown or Bethlehem but not in Easton, and that have 3 or more bedrooms and have central air conditioning and may or may not have a family room and are priced between $60,000 and $100,000".

16 Claims, 9 Drawing Figures

METHOD AND APPARATUS FOR DIGITAL SERIAL SCANNING WITH HIERARCHICAL AND RELATIONAL ACCESS

BACKGROUND OF THE INVENTION

1. Field of the Invention

This invention relates generally to methods of and apparatus for broadcasting and receiving digital data messages and more particularly to methods and apparatus for the selection of appropriate messages for the storage and display by and at the receivers. This invention is an information retrieval system comprised of a head-end digital data transmission system and a plurality of receivers.

2. Description of the Prior Art

The present invention provides a new means for accessing data bases which might be characterized as electronic (as opposed to print) classified advertising.

This invention builds on existing technology, including:

1. computer storage of information,
2. digital broadcasting,
3. text and graphic video displays (e.g. video or television displays), and
4. the logical processing capabilities of microprocessor-based consumer electronics such as video games.

It combines these technologies with an innovative method for organizing information and a simple, inexpensive digital circuit to produce a broadcast-based information dissemination and retrieval system.

REPRESENTATIVE PRIOR ART

| U.S. Pat. | | | |
|---|---|---|---|
| 3,927,250 | 2/1974 | Rainger | 178/5.6 |
| 4,006,465 | 5/1975 | Cross et al. | 340/172.5 |
| 4,267,568 | 11/1977 | Dechant | 364/200 |
| 4,115,662 | 9/1978 | Guinet et al. | 179/15 |
| 4,233,628 | 1/1979 | Ciciora | 358/147 |

OTHER PUBLICATIONS

McKenzie, "ORACLE—An Information Broadcasting Service Using Data Transmission in the Vertical Interval", Journal of the SMPTE, vol. 83, January 1974.

Edwardson et al., "CEEFAX: A Proposed New Broadcasting Service". Journal of SMPTE, vol. 83, January 1974, pp. 14-19.

Guinet, "New Services Offered Through Data Pack Broadcasting System", U.E.R.-Technique, No. 149, February 1975.

Alexander, "Viewdata and Teletext: New Electronic Home Information Delivery Systems", The Seybold Report, vol. 10 No. 6, Nov. 24, 1980.

Mello, "A Shaky Start for Electronic Newspapers", Microcomputing Industry, October 1981, pp 1,14,16.

It is known in the prior art that serial communication media can be used to transfer data among devices. See for example, Cross et al., U.S. Pat. No. 4,006,465. Also known in the prior art are television communication techniques which are suitable for the transmission of textual and graphical information as digital data. See for example, Ciciora, U.S. Pat. No. 4,233,628. Broadcast television channels have also been used in providing supplementary material which may or may not be related to the broadcast program. These systems use the vertical blanking interval of the regular television video broadcast signal in supplying digital data. Among the systems which have been proposed, the ORACLE and CEEFAX systems are best known. The ORACLE system is described in a paper by G. A. McKenzie and entitled "ORACLE—An Information Broadcasting Service Using Data Transmission in the Vertical Interval" and the CEEFAX system is described in a paper by S. M. Edwardson and A. Gee and entitled "CEEFAX: A Proposed New Broadcasting Service". Both papers were published in the Journal of the S.M.P.T.E., Vol. 83, January 1974.

The term Teletext is generally considered to refer to over-the-air transmission of textual information during the vertical interval. An obvious alternative method for transmission of such information is to use conventional telephone lines. When this is done, it is generally referred to as Viewdata. The Teletext approach, being a broadcast medium, does not involve two-way communications between the receiver and the transmission system. Viewdata systems are usually two-way interactive systems.

One-way transmission systems have been described wherein it is intended not only to make use of the field-blanking or vertical interval of a television video signal, but instead to make use of one or several full video channels. See for example the French article entitled "New Services Offered Through Data Pack Broadcasting System" (Nouveaux services offerts par un systeeme de diffusion de donnees par paquets) by Y. Guinet in the French review of U.E.R.-Technique, No. 149, February 1975, as discussed in Guinet et al., U.S. Pat. No. 4,115,662.

In the data pack broadcasting approach, each pack or data frame has a prefix consisting of synchronization signals, coded signals and service signals, followed by properly said data. Data receiver equipment is provided for deriving from the received serial digital data signals, each data pack defined by the synchronization signals, selecting certain data packs as a function of the received coded signals before storing them in a memory. By way of example, the said service signals would indicate the beginning of a data message, the number of the pack within the data stream, etc.

The above references described the technical foundations of broadcast based consumer information systems. To complete the background of the present invention, a broader view of consumer information technology and the problems that the invention solves will be presented. Here the term consumer information system is used to designate those systems which provide information or computing resources to mass market users. The term is meant to be broad enough to include information systems such as CEEFAX and ORACLE, as well as home computers and perhaps even video games.

Consumer oriented computing services now provide three types of computing capabilities: information retrieval, transaction processing, and computational services.

In the typical information retrieval system, the information in a remote data base is made available to consumer through a communication system. In one-way systems receiver intelligence is used to select appropriate data for display. In two-way systems selection is provided through the interaction of the receiver device with the host computing system. The distinguishing characteristic of information retrieval systems is that the only purpose of the interaction is to get information from the remote information provider.

Transaction processing systems involve two-way communication between the information receivers and a host computing system. In transaction systems an interchange of information takes place. Typical transaction processing applications include remote banking, merchandising, and possibly voting.

Consumer information systems can provide computational services. Here calculating rather than information storage facilities are important. Video games are an example of a very popular form of computational services. Other mass market applications might include home budgeting, energy use computations, computer aided instruction, and income tax calculations. Computational services are characterized by their use of calculating or information processing facilities.

Although all of these services are provided through the use of computer or microprocessor electronics, the resource requirements of each are quite different.

Transaction processing implies interaction of the receiver terminals with the host processing system. Given a large enough host processor, all consumer information processing services could be provided in the transaction processing mode. There are technical and financial problems with this approach. At this time no host computer system has yet been built that can support the tens of thousands of concurrent users that mass marketing implies.

Existing time-sharing or remote computing services that are now available from such venders as CompuServe of Columbus, Ohio, and The Source of McLean, Va., are priced from between $5.00 an hour, for non-business hours usage, to $25 per hour during prime time. To scan classified advertising, eight cents per minute seems a very high cost. This is why CEEFAX and ORACLE use the lower cost broadcast approach for information retrieval.

Self-contained game playing systems and small home computer systems have proven more cost effective for computational services. It is usually cheaper to buy a small computer or specialized game than it is to use a transaction oriented or time-sharing system for consumer oriented calculations. Distributed computing resources tend to be more cost effective than centralized, communications based ones.

While interactive systems provide great flexibility for accessing diverse information sources, the expense of such flexibility may not be justified in the context of mass marketed information. The clumsiness of using transaction oriented systems for retrieving a weather forecast is an example of how the individualized interaction possible with a transaction processing system is unnecessary and possibly even undesirable.

Since the current transaction processing technology seems inappropriate for mass market information retrieval services, one would expect specialized technology to be developed for each of the categories of consumer information systems services. Because broadcast systems can serve an arbitrarily large number of concurrent users, the full channel Teletext approach offers significant advantages for mass market information retrieval purposes.

A critical test for one-way systems is whether they can be used to provide an acceptable information retrieval environment for classified advertising and other similar data bases. Most classified-oriented system experiments have been two-way Viewdata systems. Experiments in this area, as discussed below, have so far yielded little encouragement for researchers. The information providers have found that transaction based systems are expensive and there is high consumer resistance to the expense of the interactive computing approach for retrieving information such as that published in local newspapers. Further, many users feel that it is difficult and cumbersome to find the information that they are interested in with current systems. Users of information retrieval systems want quick and inexpensive access to precisely the information they are looking for. A good mass market information retrieval system must combine a simple user interface with powerful searching facilities which extract appropriate information from the mass of information in the data base.

The difficulty with current approaches has been discussed in a number of reports.

The following quote was taken from a recent article in Microcomputing Industry (A Shaky Start for Electronic Newspapers by John P. Mello):

"Classified advertising in an electronic edition can be 'a real zoo'" remarked King of Videonews (Blaine King, Project Manager for Videonews). "It sounds logical right up to the time you do it. Then you've got a land mine." He explained that users may have to search as many as nine menus before they find the item they want. "If a 'keyword' system is used, how will the users known what's a keyword and what isn't", he asked.

Relational queries (i.e. ones based on combinations of keywords or attributes) provide highly selective access to information. However, if a user had to learn Boolean logic, predicate calculus, or some other fairly complex formalism to make up such queries, then there is little likelihood that the technology would receive widespread consumer acceptance.

At present, the limited query facilities anticipated for cable (or broadcast) based sequential data bases have made them unattractive to potential investors.

As George A. Alexander points out in a recent Seybold Report (Vol. 10, 6, Nov. 24, 1980):

"Selective indexes, either by keyword or by exhaustive text search, are not a realistic possibility for the first generation of V/T (video text) systems. They are not immediately practical on such one-way systems, since they would require the extra expense of special, high-speed character-matching circuits in each receiver (if done "on the fly", concurrent with transmissions) or they would have a very slow response time (if done by receiving and then searching each item in turn by microprocessor software). On two-way systems, each with data bases of moderate size, full-text search imposes a very high processing load on the host computer, making it impractical for a service of this sort given today's technology. Keyword indexing, though more practical than exhaustive search, also imposes a heavy processing burden."

Mr. Alexander also states:

"Both the keyword index and full-text search nevertheless will require an alphanumeric keyboard for the receiver, adding significantly to its cost."

In contrast to the prior art, the present invention solves all of these problems. We call the invention "ReQueSt-DB." The name is derived from "Relational Queries on Sequential-Data Bases." ReQueSt-DB provides a means of organizing the information in a classified (or classified-like) data base so that when the entire data base is repeatedly broadcast, even at a high data rate, it can be accessed by the ReQueSt-DB circuitry to select ads (or messages) by categories and combinations of keywords.

ReQueSt-DB solves the "user interface" problems by supporting relational queries in a uniquely simple and natural mode.

ReQueSt-DB consists of the following new technological developments:

1. A means of logically organizing information in a sequential data base for a combination of efficient hierarchical and relational access.

2. A means by which special digital circuitry and programmed logic can select information from data bases organized as mentioned above.

3. A means by which the complex logic involved in specifying such access is carefully managed so that it is easy to use and understand.

2.1 Data Base Structures

When we state that ReQueSt-DB is a technology suitable for electronic broadcasting of classified advertising, we are focusing on data bases which have specific characteristics. From this characteristics are derived certain access support requirements.

Data bases for which ReQueSt-DB is suitable are composed of related messages or frames of data. To permit the user to access appropriate messages efficiently, a logical organization is imposed on the data. Consider, for example, a newspaper's printed classified. It consists of a sequence of ads. These ads are the messages or frames of data of the classified data base. To permit the reader to efficiently access the messages that he might be interested in, a printed classified is carefully organized. The ads in the classified are divided among categories and sub-categories. There are housing, employment, legal notices, personals etc. The ads are collected into the categories. Some categories are composed themselves of categories, for example, the housing or real estate ads might cover rental properties and properties for sale. Thus, categories may have sub-categories.

The logical structure of a data base having items organized into categories and sub-categories is called hierarchical. One can think of a hierarchical data base as a branching tree structure—all sub-structures are attached to the trunk or base of the tree. The main branches correspond to the categories of the data base. Branches off of them correspond to sub-categories. Finally, the leaves correspond to the actual data frames or messages in the data base.

We can also see other logical organizations in the printed newspaper classified. In the employment section, employment ads are frequently organized in alphabetical order by job title. Thus, all the programmer jobs would be organized together and probably come after the mechanical engineering jobs. This alphabetical order provides an important secondary ordering scheme to the data items in printed classified. The job title becomes a keyword by which the appropriate ads are quickly found.

When combined with hierarchical organization and access, keyword access provides a powerful tool for selecting appropriate data items. The power of keyword access is greatly extended, if queries can be formulated in terms of combinations of keywords. For example, an engineer might wish to only look at ads for mechanical engineers and only at those with salaries greater than $40,000 per year. The ability to use keywords in combinations is called relational queries or relational access. Relational queries provide the most powerful and functional access to data bases. This is especially true for data bases which are organized so that relational queries can be done in the context of appropriate sub-categories, which is precisely the mode of access which is supported by ReQueSt-DB.

It is important to distinguish between the logical organization of the data base and the physical organization of the same data base. The logical organization of a data base corresponds to the view that a user has of the data base. The underlying physical organization of the data base may bear little relationship to the logical view supported for the user of the data base.

Returning to our example of newspaper classified advertising, note that the ads appear in sequence. The hierarchical structure supported by the categories and sub-categories of advertising is imposed by headlines denoting where the sub-categories start. The logical structure is hierarchical. The physical structure is sequential. ReQueSt-DB provides a logical data base structure that permits both a hierarchical and relational access. The actual physical structure of a ReQueSt-DB data base is simply a serial sequence of (possibly) many thousands of data frames.

The logical structure determines how easy the data base is to use. The physical structure determines how it is processed.

The physical structure of a ReQueSt-DB data base is a serial stream of data bits. These bits are organized into frames which correspond to the messages in the data base. The logical structure supported by the ReQueSt-DB technology consists of both a hierarchical schema and a relational query facility.

2.2 Relational Queries

A query is a request for information. A relational query is a qualified request which selects information based on a combination of attributes. An attribute is a descriptive term for an item.

Keywords and attributes are similar but not identical concepts. A keyword or key phrase is a sequence of characters that occur in the data frame. Many keywords or key phrases may map into the same attribute. For example, "no pets" or "pets forbidden" in the context of an ad for an apartment mean the same thing, that is, describe the same attribute. This attribute might be called "pets aren't allowed". There is no requirement that the phrase "pets aren't allowed" be in the data frame for the attribute to hold. The phrase, in this case, is simply the name of the attribute.

Attributes provide a means of controlling the vocabulary or specification language of a retrieval system based on keyword searching. For example, if a house is described as "large split level, 5 bedrooms, 2 baths, exceptional kitchen, cozy family room with efficient fireplace, great family location at only $78,500 in San Juan", then some of the attributes for this house description are "5 bedrooms", "2 baths", "$78,500", and "San Juan". Other attributes could be extracted as well. Relational queries that would select this description among other descriptions might say, "5 bedrooms and price from $70,000 to $80,000". The operator "and" combines the "5 bedroom" attribute with the price range attribute.

The most general form of relational queries provides the most computationally complete and efficient (from the querier's point of view) access to large quantities of data.

2.3 Sequential Data Bases

A file is a collection of records, each of which describes certain items. A data base is a file in which the records contain information which establishes relations among data items. Most data bases provide direct access to data items by schemes of indexing or content addressability. The indices of a data base are like a dictionary's thumb indices. The thumb index provides fast access by permitting you to go directly to the appropriate section of the dictionary.

In direct access data bases the records are numbered and the location of each numbered record is known. Retrieval is done directly by the record number or indirectly through an index by a key or keys to the record number or through a context-dependent transformation on a key or keys yielding a record number. (This last method of finding record numbers/locations is called "hashing".) The relations in a direct access data base are implemented by the use of pointers in certain records to other records. The physical analog to a direct access data base is a phonograph record. You can play (retrieve) any tune by lowering the stylus onto the appropriate track.

Sequential data bases contain relational information just like direct access data bases. However, the organizational structure of a sequential data base is simply a series of records. The records are typically unnumbered and instead of being able to access a record by its record number a sequential data base requires that each record be scanned in order.

A physical analog of a sequential data base is a music tape. You can play (retrieve) any tunes you want as long as you play them in order. The only alternative to this is to skip past the ones you don't want using the fast forward option of the tape drive. Finding information in a sequential data base may require scanning through the entire data base (like a microfilm roll of a dictionary).

On traditional computer systems, sequential data bases are only appropriate for tape files or small disk data files. Seldom do sequential data bases exceed a thousand records in typical disk-based computer systems. Because of this application size restrictions, limited research has been done in the technology of sequential data bases. (See Dechant et al. U.S. Pat. No. 4,267,568 for some of the advanced research in sequential searching.)

The availability of low-cost microcomputers, such as those used in TV games for the home, and the high data transmission rate that is possible on cable TV channels offers the possibility of providing a low-cost easily-implemented, cable-based, classified ad system using sequential data base technology.

2.4 Teletext

The Teletext technology, which permits the greatest number of concurrent users at the lowest price, is a combination of frame-grabber technology with a digital sequential data base. This technology features the cyclical re-transmission of the data set to all receiver nodes. Head-end communications are simple because they aren't multiplexed. Intelligence at the receiver node selects appropriate frames from the serial data stream. Receiver electronic technology, with the sophistication of a video game, is capable of selecting numbered frames from the data set at data rates from 3 to 60 megahertz. This data rate would allow data bases from 3 million to 60 million characters to be transmitted during a 10-second cycle, if the fully capacity of a television channel is used for serial digital data signal. Average frame accesses would take 5 seconds.

Typical classified newspaper sections are from one to three million characters. The daily editorial content of large metropolitan newspapers averages six million characters. Hence appropriate choices for a full channel broadcast-based classified systen would be a six megabaud data rate to transmit a six million character classified data base during a ten-second cycle.

Rainger (U.S. Pat. No. 3,927,250) shows how a display (preferably a television set), local charcter storage (RAM), a character generator, and a frame selector can be combined to form a Teletext system using the limited frame capacity of the vertical blanking interval.

With prior art systems a Teletext user sees a list of menu items on the display. With each menu item is associated a number, said number being the page or frame number associated with the menu item. A numeric keypad is used to indicate the next desired frame, which itself might be another menu or the final fully categorized frame. The user navigates thru the logical hierarchy of the data base by entering the digits of the frame numbers.

The menu/page number access technique is clumsy even for searching the number of frames allowed by the small capacity (approximately 200 pages per 10 second cycle) of the vertical blanking interval. When scaled up to handle a full channel of digital data, access to the many thousands of pages becomes nearly intractable with the menu/page number technique.

The present invention is designed to solve this access problem by eliminating the entry of digital page numbers and by supporting not only hierarchial access but relational queries as well.

BRIEF SUMMARY OF THE INVENTION

ReQueSt-DB is an information system comprising a remote information source for remotely and continuously transmitting information in a common pre-defined, pre-determined format over a common transmission media in which the information comprises frames of digital data. Each frame is composed of a headnote and certain (usually) displayable data. The displayable data can be composed of character or graphics codes. (Data not intended for display, e.g. microcomputer programs, could also be sent in the 'screen' portion of a data packet.) Along with the information source, the system contains a plurality of receivers. Each receiver being capable of interacting with a user of the information service such that a selector circuit can be set up to grab data frames based on a combination of attributes, specifically, said combination of attributes allowing relational queries against the transmitted data stream.

By way of analogy, each frame's headnote can be thought of as a lock which guards the frame. The receiver circuitry is set up by the user so that it forms a key. The key will unlock appropriate message frames. When the key opens the lock, the message is frame-grabbed from the data stream. ReQueSt-DB corresponds to a master locking system in which certain keys will open more locks than others. ReQueSt-DB allows tailoring the keys to unlock the desired message frames.

In addition to the usual frame numbers (in the preferred embodiment, a number between, zero and 2 to the 24th power (about 16 million)), there are two additional sets of values used as frame identifiers in ReQueSt-DB. These two additional values are called the path part (200 bits), and the attribute part (32 bits). One of the advantages of the ReQueSt-DB approach is that the user never sees these cryptic frame numbers or any of the encoded frame identifier values.

Screens that are part of a menu selection sequence ony have a path part. The path part is a variable number of values in the range of one to 31. (The number 31, in this case, is simply chosen as the preferred embodiment. A larger number could just as easily have been chosen. Two hundred bits are allowed, giving a maximum of 40 five bit values (range 1 to 31) preferably for the path part.) The top level screen has no path part and is selected by its frame number (0). Its successor screens or child screens have path values 1 thru 31. Their children have path values 1,1; 1,2; 1,3; . . . 1,31; 2,1; 2,2; 2,3; . . . 2,31; . . . 31,31.

When the user chooses to go down a level in the tree structure using the menu selection mode, there is a number between 1 and 31 associated with each menu item. This number is appended or concatenated to the current path number list forming a new path number list which is the number of the new screen that the user has selected. All of the manipulation of path number sequences in forming a request is completely hidden from the user by ReQueSt-DB. He just moves the cursor to the next desired menu item and presses the button. Finding the next requested screen then is a matter of scanning the data base for a screen with the new path number sequence.

Menu driven queries become cumbersome if there are many levels of menus in the data base hierarchy that must be accessed to get a desired message. Once a few menus have been used to localize a query, selection by combination of attributes greatly facilitates finding the desired information. For selecting items based on a combination of attributes, ReQueSt-DB provides relational queries against a high-speed serial data base. Thirty-two additional bits (preferably) of frame identifying information are used for attribute specification. Each of the 32 bits stands for the presence or absence of an attribute. The frame number (24 bits), path number sequence (up to 200 bits), and the attribute set specification (32 bits) comprise the 256 bits (or 32 eight bit bytes) of frame identification information used by ReQueSt-DB.

The frame identification information and an additional 96 bytes (or 768 bits) of information make up the headnote. This additional information is used by the receiver along with user keypad input in setting up its pattern matcher for selecting frames by their identifying information.

The receivers have frame-grabber and pattern matching electronics which are controlled (preferably) by microprocesser electronics. The pattern matcher has two 256 bit registers, the first is set up in the receiver to compare against the frame identification values in the data base and the second is set up in the receiver to determine which bits of the frame identification value should be compared.

Using the combination of the two values set up in the pattern matcher registers, appropriate frames are identified in the data base.

The actual hardware of the pattern matcher in our preferred embodiment is made from easily available parts and is likely to have an end-user price of about $10. In addition to the pattern matcher, the end-user electronics might be built into current video game systems and could certainly be built into or attached to commercially available home computers.

The user interface consists of a keypad and displays. The displays consist of menus, keyword or key phrase search terms (or attribute) displays, and data frames. The menu and key phrase displays provide an environment for establishing queries. The keypad to support data base retrieval with this technology requires only seven buttons.

A method according to the invention uses a data processor, a bulk memory, a data base composed of frames or messages (i.e. data packs) each with a specially coded headnote, and a transmission system (preferably, television channel based) said system called a head-end system, to cyclically retransmit the data base in a one-way non-destructive manner to a plurality of receivers. A method according to the invention also uses a plurality of receivers, each receiver comprised with a display (preferably a television), a character generator, a transmission reception frame grabber system, a pattern matcher, a memory for one or more data frames, a data processor (preferably a microprocessor) and a keypad.

Also according to the invention a method is provided for selecting the principal frame of the data base at receiver start-up and thereafter, based on the information in the headnote of the principal frame and the headnotes of successively selected frames and users keypad input, selecting frames such as to give both hierarchical and relational access to the information in the cyclically transmitted data base.

A novel apparatus also is disclosed for carrying out the aforementioned methods.

TABLE OF CONTENTS

I. Background of the Invention.
  1. Field of Invention
  2. Description of the Prior Art
    2.1 Data Base Structures
    2.2 Relational Queries
    2.3 Sequential Data Bases
    2.4 Teletext
II. Brief Summary of the Invention.
III. Brief Description of the Drawings.
IV. Description of the User Interface.
  4.1 What the User Sees 4.2 Menu
4.3 Data Screens
4.4 Relational Screens
V. Relational Queries and Spanning Sets.
VI. Detailed description of the Preferred Embodiment.
  6.1 How It Works Inside
  6.2 System Overview
  6.3 Receiver Overview
  6.4 Selector Box
  6.5 ReQueSt-DB Data Base Logical Structure
  6.6 The Keypad and Its Function
  6.7 Data Format for the Serial Data Base
  6.8 Screen Capturing Electronics
VII. Discussion of the Prototype Computer Programs.

DESCRIPTION OF USER INTERFACE

4.1 What the User Sees

The initial capabilities we wished to give to ReQueSt-DB were designed to support relational queries on the data that ordinarily appears in the classified section of a newspaper. To support this we designed three different frame or screen types that the user could have displayed. The three screen types are: menu, data, and relational.

4.2 Menu

Menu displays show a list of alternatives. The user reacts to the menu display by tabbing to the appropriate menu item and initiating a "down/in" request. This operation will select the appropriate successor screen.

Figure 4:
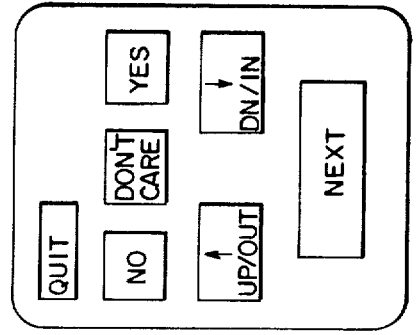
FIG. 4 illustrates the preferred keypad key layout.

The operators "DOWN/IN", "UP/OUT", "NEXT", "QUIT", "YES", "NO", and "DON'T CARE" relate to the keys on the keypad (see FIG. 4). The user invokes the function actions by depressing the appropriate key.

The primary difference to the user between this type of selection and that which is used in current Teletext systems is that items are selected by positioning a cursor as opposed to entering numeric values. The initial screen in the data base is always a menu screen. The successors of menu screens are either data screens, relational screens or additional menu screens. When the cursor is on the last menu item, the "next" operator causes the cursor to move to the first menu item.

|   |
| --- |
| - NOTICES |
| - PERSONALS |
| - LOST AND FOUND |
| - EMPLOYMENT |
| - PETS |
| - BUY AND SELL |
| - HOUSING |

Example: Menu Screen

The operator "next" tabs the cursor to the next menu item and the operator "down/in" selects the display for the path menu item at the cursor. The operator "up/out" selects the predecessor menu display.

4.3 Data Screens

Data screens are the terminal nodes of requests. Their purpose is to display the actual requested information. Data screens can be selected either through a series of menu screen actions or through a series of menu screen actions followed by a relational screen action.

|   |
| --- |
| Modern Apartments - Downtown Easton |
| 1-2 bedroom, air, laundry facilities. |
| $300–$500 w/utilities. |

|   |
| --- |
| -continued |
| Paradise Arms 235-0101 |

Example: Data Screen

The operator "up/out" returns to the previous menu or relational display. The operators "down/in" and "next" cause the display of the next data screen which has attributes compatible with the current relational request.

In the preferred embodiment an enhancement was added which allowed data screens to be continued. This required adding a new screen type called multi-data. "Next" gets successive multi-data screens.

4.4 Relational Screens

Relational screens are used to formulate relational queries on subsets of the data screens. A relational screen consists of a list of attributes. For each attribute the user can select whether he desires the attribute, does not desire the attribute, or does not care whether the attribute is present in the data or not. Selection criteria can be composed of any combination of the displayed attributes.

| | | |
| --- | --- | --- |
| ? house | ? apartment | ? condominium |
| ? 1 bedroom | ? 2 bedrooms | ? 3 or more bedrooms |
| ? urban | ? suburban | ? country |
| ? utilities | ? air cond. | ? washer/dryer |
| maximum rent: | ? $100–$200 | ? $200–$250 |
| | ? $250–$300 | ? over $300 |

Example: Relational Screens

When the relational screen is initially displayed, all of the attribute selectors are set to the "undefined" condition. The operators "next" and "no" on an attribute field which is "undefined" change it to "no" (i.e. screens with this attribute should not be selected). The operator "yes" causes the attribute to be selected. The operator "no" causes the attribute to be excluded. The operator "don't care" causes the attribute to be ignored. The operator "down/in" causes selection of the first screen which satisfies the relational attribute selection criteria. Attribute fields which are "undefined" at the initiation of the "down/in" operation are set to the "don't care" condition. The operator "up/out" causes the selection of the parent menu screen for the current relational screen. After the invocation of the "no", "don't care", "yes", or "next" operators, the cursor is tabbed to the next attribute. When the cursor is positioned at the last attribute, execution of any of these four operators will cause the cursor to be repositioned at the first attribute.

RELATIONAL QUERIES AND SPANNING SETS

As the prior art references show there are difficulties in combining both hierarchical and relational query facilities in a user friendly interface. The logic which supports the simple and obvious interaction described in the previous session requires careful information engineering. The problem can be illustrated by several examples. Consider the following four relational queries on classified residential housing ads.
1. Houses in Bethlehem.
2. Houses in Bethlehem with 5 bedrooms.
3. Houses in Bethlehem with 5 bedrooms and houses in Allentown with 4 bedrooms.
4. Houses in either Bethlehem or Allentown with either 4 or 5 bedrooms.

The first request seeks data on housing ads with the attribute Bethlehem. Given a known set of attributes, bits in the pattern matches could be set to select frames with this particular attribute's bit set in their headnote.

The second request illustrates the use of a combination of attributes. Given a set of attributes and a "don't care" mask on the attributes, the attribute request set would have Bethlehem and 5 bedrooms, selected positively, and the corresponding elements of the "don't care" mask set to "match".

The third request is somewhat different. If the user selects houses in Bethlehem and Allentown, he certainly doesn't expect the result that the relational calculus will yield. Simply, there are no houses that are simultaneously in both Bethlehem and Allentown and, therefore, the obvious implementation of a set-based attribute selection technique (i.e. setting both the Allentown and the Bethlehem attribute bits in the pattern matcher for selection) will not work. What a querier means when he says "Show me the houses in Bethlehem and Allentown" is "Show me the houses that are either in Bethlehem or Allentown". The important insight here is that there is a difference between the logic of queries and the logic of relational or predicate calculus.

It can be shown that the simple one-stage pattern matching technique of ReQueSt-DB is inadequate for full relational expressions. However, it does seem adequate for the usual logic of queries. Multi-stage logic could handle a request like number 3 but would severely complicate the electronics of the system without actually increasing its ease of use.

A request like number 3 cannot be done as a single query with ReQueSt-DB. However, it is likely that the user is more interested in the similar query specified in request number 4. There are no houses that have both 4 and 5 bedrooms (at the same time) and are located in both Allentown and Bethlehem, but there are certainly houses in either Bethlehem or Allentown that have either 4 or 5 bedrooms. ReQueSt-DB supports queries like number 4.

Additional information is needed in a data frame to permit ReQueSt-DB to handle the type number 4 request. The relationships among the attributes are important. We need to know which subsets of the attributes are mutually exclusive (i.e. the number of bedrooms or the set of locations are mutually exclusive subsets of the attribute set). We call these mutually exclusive subsets the "spanning sets". In each relational frame with each set of attributes we define and later transmit in its headnote up to eight spanning sets. When multiple attributes are selected which are members of the same spanning set, these attributes are treated as alternatives rather than combinations. For example, selecting both Allentown and Bethlehem would cause the selection of all housing data frames which have either Allentown or Bethlehem as an attribute.

The computation to use the spanning set information in the formulation of the attribute and "don't care" masks is quite straightforward. The corresponding elements for multiple selected elements of a spanning set in the "don't care" mask are assigned "don't care". The complement of the corresponding set of the spanning set is set to "match" and all attributes that were not requested are set to "no".

For example, consider a screen for selecting housing with many attributes on it. A subset of these attributes would be the location attributes. The location set might consist of the names of the local communities, for example, Bethlehem, Allentown, Easton, Palmer Township, Berks County, etc. The set of locations would form a location spanning set that is a subset of the housing attribute set. Selecting Allentown and Bethlehem is equivalent to saying: "I don't care if it is in either Allentown or Bethlehem as long as it is not anywhere else."

The notion of spanning sets and the fact that they can be transmitted with the relational screens is one of the fundamental innovations of ReQueSt-DB.

DETAILED DESCRIPTION OF THE PREFERRED EMBODIMENT

6.1 How It Works Inside

There are two components to the serial relational data base system. The first of these maps textual input into frames which can be selected by the ReQueSt-DB interface. The specification for each frame includes the textual and graphical matter which will be displayed on the screen, a frame number (the sequence number of the ad), a specifier of the path through the data base which will select that screen, and, if appropriate, a list of attributes that are associated with that screen. The name of the screen and the cursor positioning in the information display are also specified.

From the path and attribute data is constructed a pattern which becomes a specifier for the selection of the screen. This pattern is composed of the frame number, a number list which uniquely identifies the path which constitutes the menu selection sequence and a set which specifies the combination of attributes. The output of the definitional program (see the section below on the programs) is a frame which includes header data in a fixed format and textual and possibly graphic display data which is variable in length. The header contains the pattern, the spanning sets, the cursor positioning information, and the screen type.

The receiver node user-interface component of ReQueSt-DB takes the operations initiated by the user to construct path and attribute values which then become the selectors for screens. The preferred embodiment uses a pattern (i.e. the combination of frame number, path and attribute information) which is 256 bits long. This pattern length supports 40 levels of menus. Each menu at each level has up to 31 descendent choices and each choice can be a data, menu or relational screen. Each relational screen has a set of up to 31 attributes which can select from an arbitrarily large number of data screens. (This pattern size is sufficient for a data base of classified ads which includes every classified ad that has ever been published.)

The pattern matching logic is a set operation which combines selected and excluded elements of the pattern with a "don't care" pattern. In software, the pattern matching operation is a single set expression. It is unlikely that the current generation of microprocessors would be able to carry out this operation with software alone in a manner fast enough to keep up with a high-speed digital data stream. However, the hardware to implement this computationally intensive function is likely to cost less than $10. The set test is the only computationally intensive operation in the entire ReQueSt-DB design. Implementing the user-interface for ReQueSt-DB on microprocessors such as those used in video games is well within the state-of-the-art. Our demonstration technology completely specifies how the program should work.

6.2 System Overview

Figure 1:
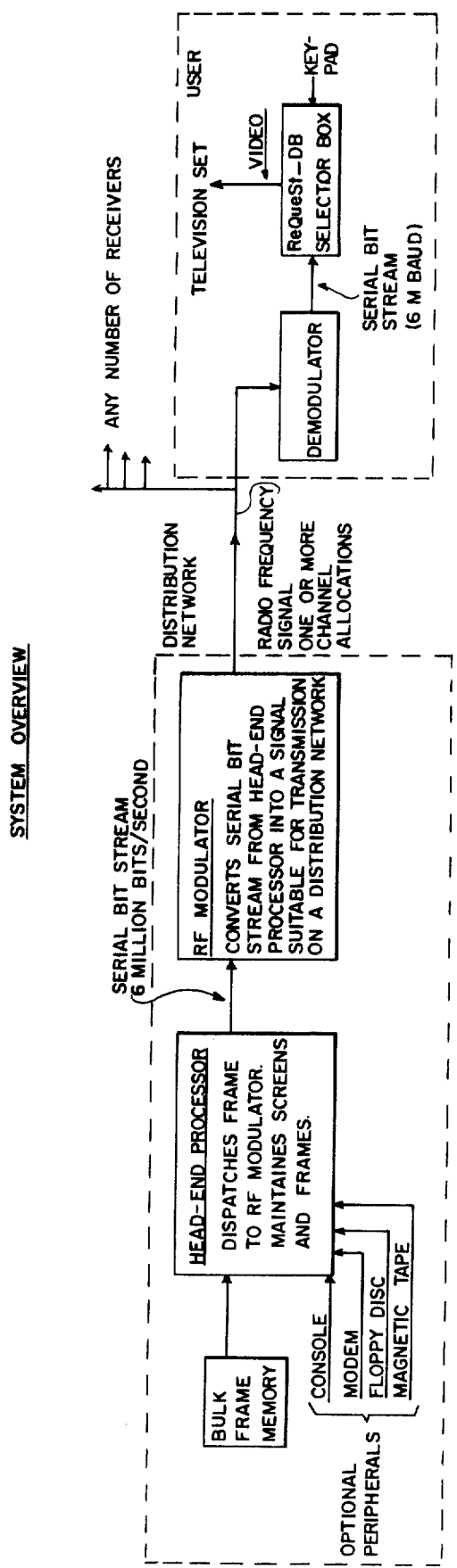
FIG. 1 illustrates an overview of a preferred hardware system of the invention including a head-end system and a plurality of receivers.

FIG. 1 is a system overview. It shows a head-end computer feeding the cable or transmission network and a multiplicity of receiver stations. It is possible to connect hundreds of thousands of receivers to the network and still have them access the information on it without interfering with one another. ReQueSt-DB seems interactive while requiring only one-way broadcast type communication. The head-end computer system located at the network distribution source is used to place digital information on one or more television or data channels without any regard to the number of users of ReQueSt-DB.

The head-end processor consists of a bulk memory which contains the data frames and a processor which simply is used to broadcast the set of the data frames out onto the transmission network through a modulator circuit in a cyclical and repetitive fashion.

For classified advertising one would expect the bulk memory to be capable of holding five to ten thousand frames, each frame holding one or more related classified ads each averaging approximately 600 characters. Each character requires about ten bits per character. In the preferred embodiment, this data could then be put on a cable television network channel at 6 megahertz, which would yield a frame transmission speed of 1,000 frames per second and a data rate of 6 megabaud. Thus, the entire data base of 10,000 frames could be re-transmitted once every 10 seconds. The average wait time for any given frame would then be 5 seconds and, given sufficient local storage and intelligence, the message control unit could buffer frames in anticipation of the user request.

Preselecting the next possible frames in anticipation of keypad selection is quite easy to do since the keypad only has three keys which will cause the selection of frames which, as yet, might only be available from the data base. The three frames corresponding to the three keys could then be grabbed during a single cycle of the data base so that, in most cases, it would appear that display update would be instantaneous with keypad action.

A slightly different configuration of the system would allow the bulk memory to be much larger and the transmission time to be longer. One could envision a bulk memory that could contain all of the real estate ads around the country. Here, instantaneous response to a user/subscriber is traded for access to a very large data base. On large data bases query request set-up would be facilitated by having the frames involved in the set-up be transmitted more frequently than once per data base cycle. These transmitted screens would allow the subscriber to interact in the ReQueSt mode to set up a selection criteria which could then be used to capture data frames over a fairly long period of time. At the data rates possible with the ReQueSt-DB system, one can anticipate that a million employment ads could be cyclically re-transmitted over the period of an hour or so. Receiver message control units in the subscriber home would, in this case, collect the frames for later viewing. The receiver would store frames on tape cassettes or other media. Such technology is also well within the current capabilities of sophisticated video games.

For the head-end computer system in the preferred embodiment, we are using a Motorola 68000 microprocesser which is built onto a board and plugged into a DEC PDP11/23 22-bit Q-bus backplane. The Motorola 68000 has a large address space and the 22-bit Q-bus backplane is a means for supporting large bulk memory. Bulk memory is readily available from suppliers wh: sell DEC compatible memory.

6.3 Receiver Overview

Figure 2:
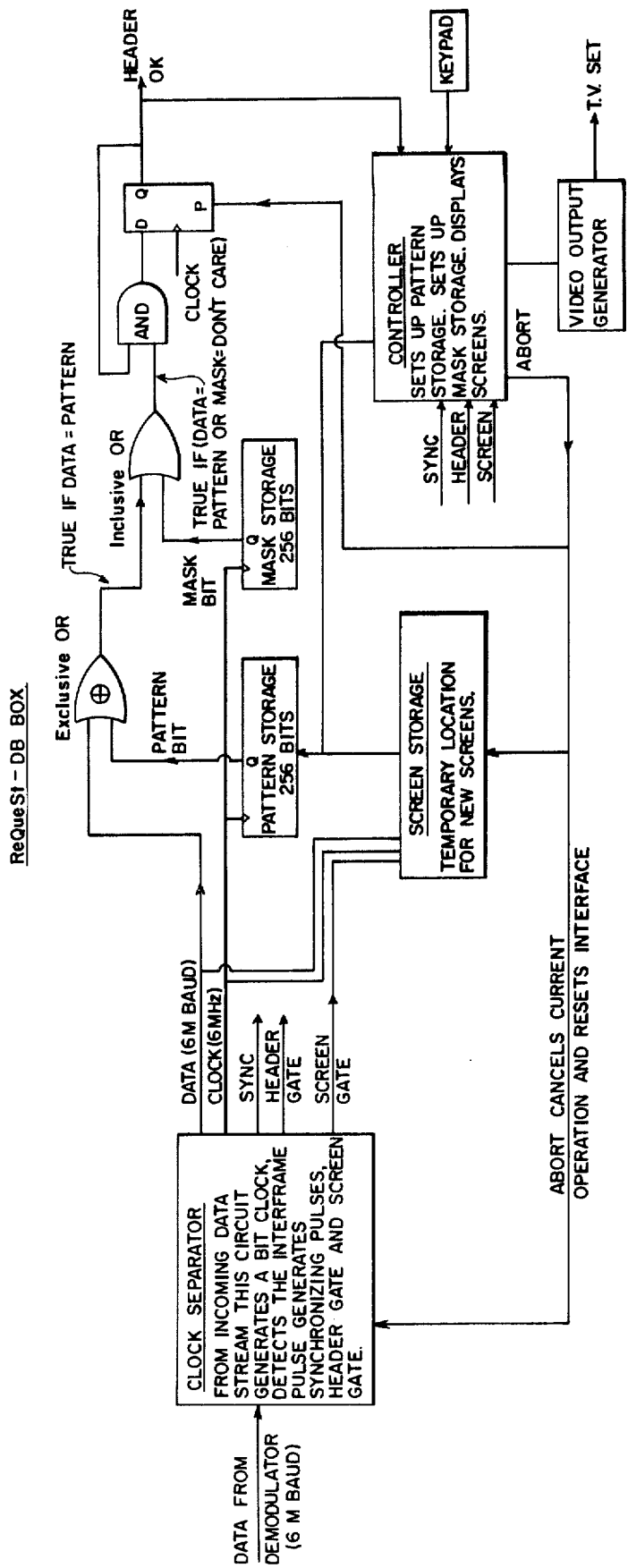
FIG. 2 is a detailed view of receiver hardware for use in FIG. 1, including a transmission reception system, screen storage, pattern holding registers, controlling microprocessor, character generator, video output generator, television display and keypad.

FIG. 2 is the receiver overview. This is the device that would be in each information subscriber's possession. For the most part, the circuitry might resemble that of a video game attached to a TV set and having a keypad or paddle control for input. (A particularly well-suited commercially available video game for this purpose might be the Mattel Intellivision System.)

Information on the TV data channel is decoded by the demodulator and turned into a bit serial data stream. The ReQueSt-DB selector forms a gate which allows certain messages to be captured. Although this is not a complex circuit, it is necessary because the low cost microprocessors that would be used in the receivers are not likely to be fast enough to access a data stream at the high data rate that is possible on the TV channel (approximately 6 megabaud or 6 million bits per second).

The ReQueSt-DB selector captures data frames and stores them in a set of pages of RAM memory in the message control device. Any of the pages in the message control device can be considered the current page and have its data sent to the character and graphics generator which is attached to the television display.

The keypad provides a means by which user input is sensed for setting up the selector so that appropriate messages can be captured. The keypad comprises seven buttons of which only three ("down/in", "up/out" and "next") can cause a new frame to be selected, hence the system lends itself to very simple keypad devices.

6.4 Selector Box

Figure 6:
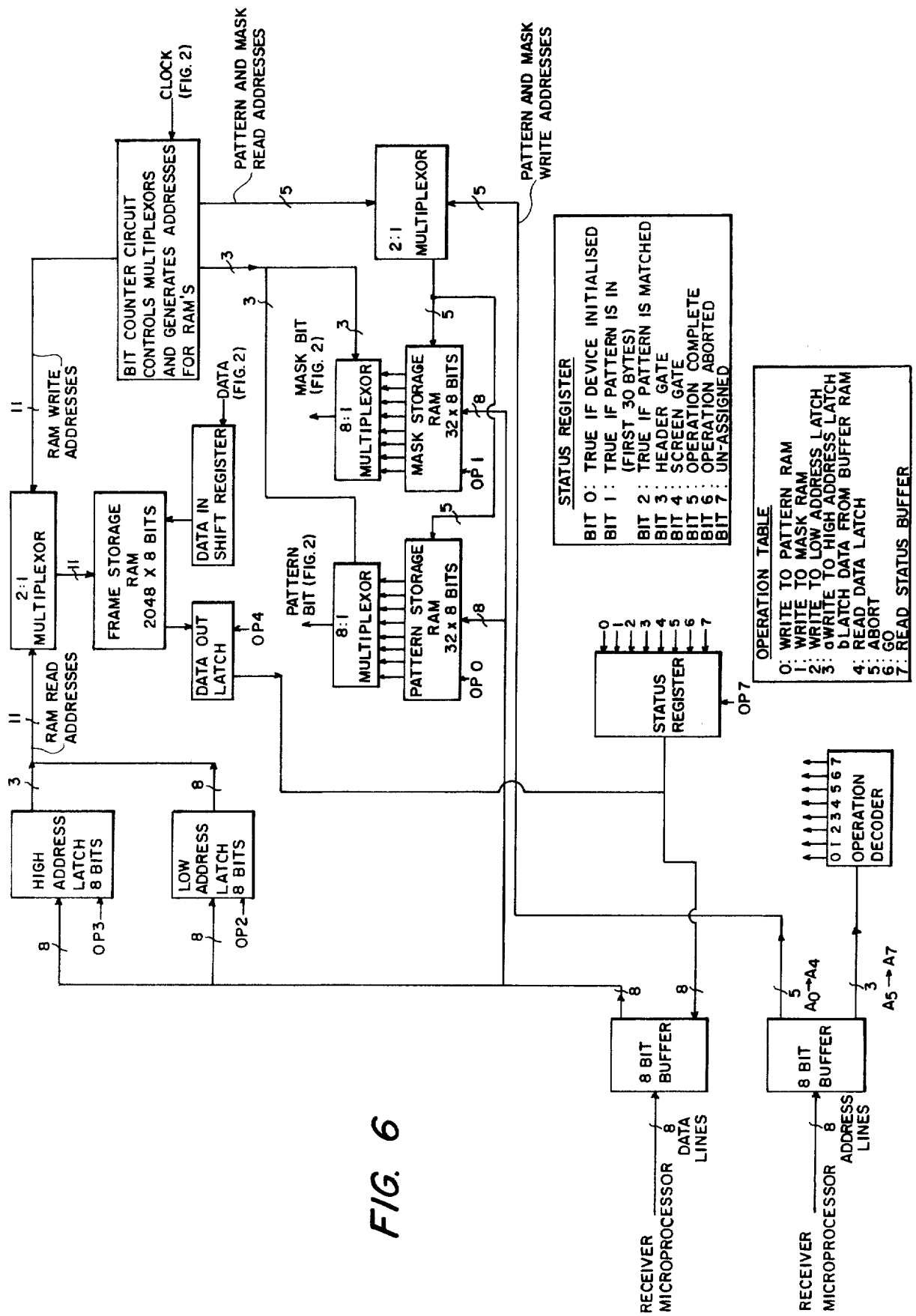
FIG. 6 illustrates a preferred embodiment of the modules of the pattern matcher and screen capturing hardware.

FIG. 6 shows the ReQueSt-DB selector. It contains circuitry which synchronizes on the headnotes of the messages in the data stream. It also contains two 256-bit masks. The first mask contains the pattern data which is compared against the headnotes of the messages in the data stream. The second mask filters the result of that comparison and excludes those bit mask tests which are "don't care" conditions as far as the selector is concerned. The selector operates at the data rate of the message stream, captures frames from the message stream, and provides for their transfer and storage in the RAM memory of the message control unit.

The ability to capture frames from such a high-speed data stream is a known part of the Teletext technology. The added capability provided by the ReQueSt-DB invention is the ability to select messages based on hierarchical relational queries.

6.5 ReQueSt-DB Data Base Logical Structure

Figure 3A:
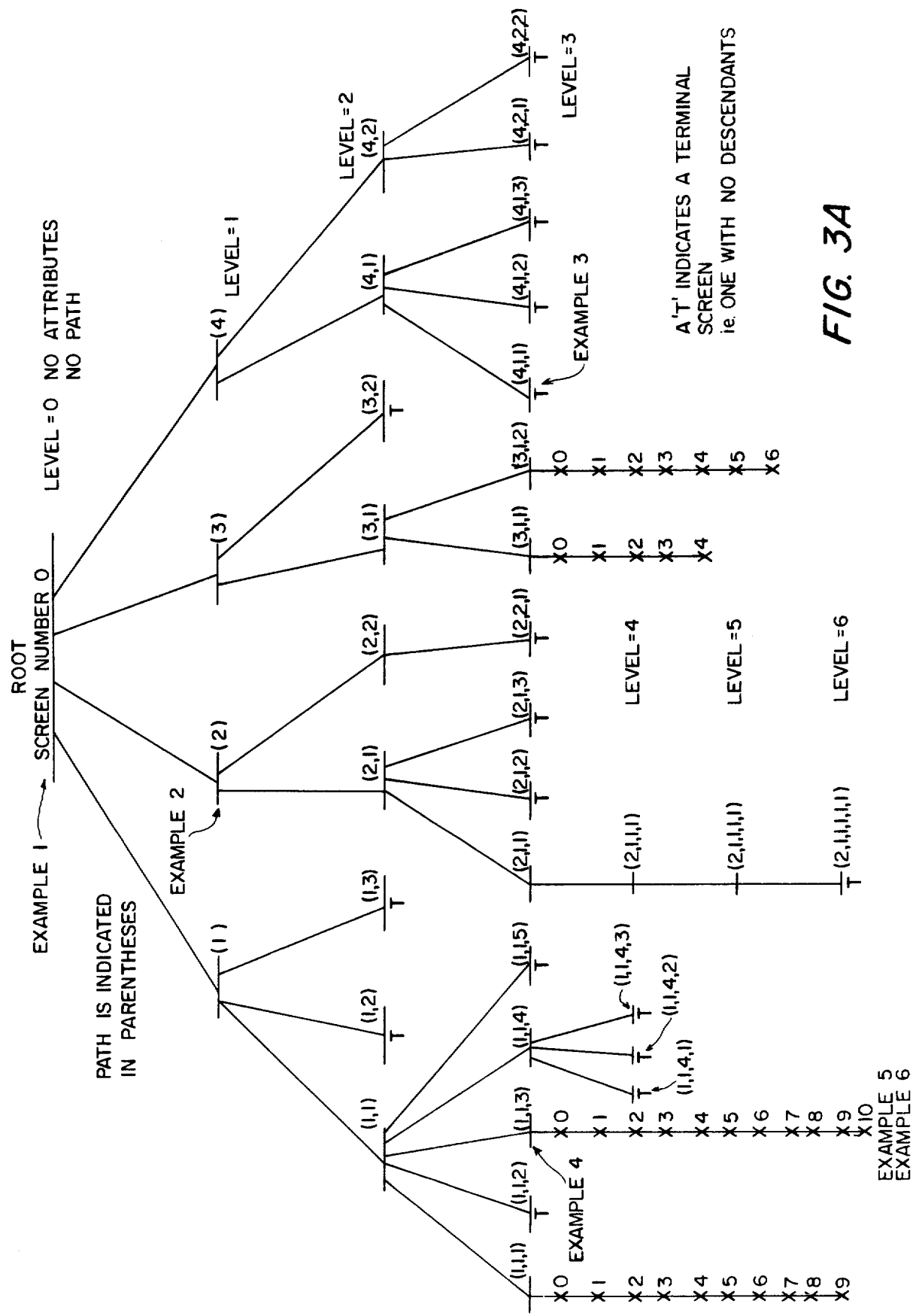
FIG. 3A depicts an example logical data base structure for the present invention.

FIG. 3 is a depiction of the logical structure for a preferred ReQueST-DB data base. The structure is a tree modified such that some nodes may have an attribute selector on them and more than one screen descending from them. Notice that unlike the prior art Viewdata or Teletext data bases, the logical structure of this data base contains not only a hierarchical organization with levels, sublevels, categories, sub-categories and so forth but it also contains nodes which have a multiplicity of frames attached to them. From this multiplicity of frames, particular frames are selected with the relational query capabilities of ReQueSt-DB. Thus, the hierarchical structure provides a context for the keyword or relational query searches that go on with ReQueSt-DB. To reach an individual screen one starts at the root and by making selections moves down one level at a time until the desired position is reached. Each individual frame in the ReQueSt data base has a path associated with it that describes its location on the tree. The figure shows these path numbers in parenthesis at each node. One important aspect of this structure is that no node can be reached by more than one path, thus, each node has a separate path descriptor.

Each frame also has associated with it a frame number that is used for bookkeeping and testing purposes. The root, which is the top most, or level 0 screen in the figure has no path and no attributes and is defined to be screen number 0. When the ReQueSt system is started up, it will look for screen number 0 so that it always starts at the root of the tree. (The operation in detail is: set selector frame number to 0, "match/don't care" mask to 24 bits of "match" and rest to "don't care", sync on frame start and scan for a match.)

In this clarifying example there are seven levels and 11 attributes for each frame. In the preferred embodiment there are allowed 31 data dependent attributes and 40 levels. This allows 40 to the 30th po menu screens. This is an extraordinarily large number of possible screens for hierarchical or tree-oriented access. Nodes that have no children (i.e. no furter place to go) are denoted by a T (for Terminal nodes). Nodes that have attributes and, therefore, may have a large number of screens descendent from them are indicated in FIG. 3 by vertical lines with the attributes indicated by X's.

The path portion of the selection pattern is composed then of a string of numbers from 1 to the number of levels allowed. For each node path nulist is the selection number in the tree. In the preferred embodiment each path number list element is a number in the range 1 to 31. The attbinary flags, either true or false. Attribute number 0 has arbitrarily been designated to indicate whether or not a particular data screen has attributes. Menu screens and relational screens are not selectable by their attributes (i.e. they have no attributes). In the FIG. 3B numbers that must be matched have an "M" under them and "don't care" selections have an "X".

Figure 3B:
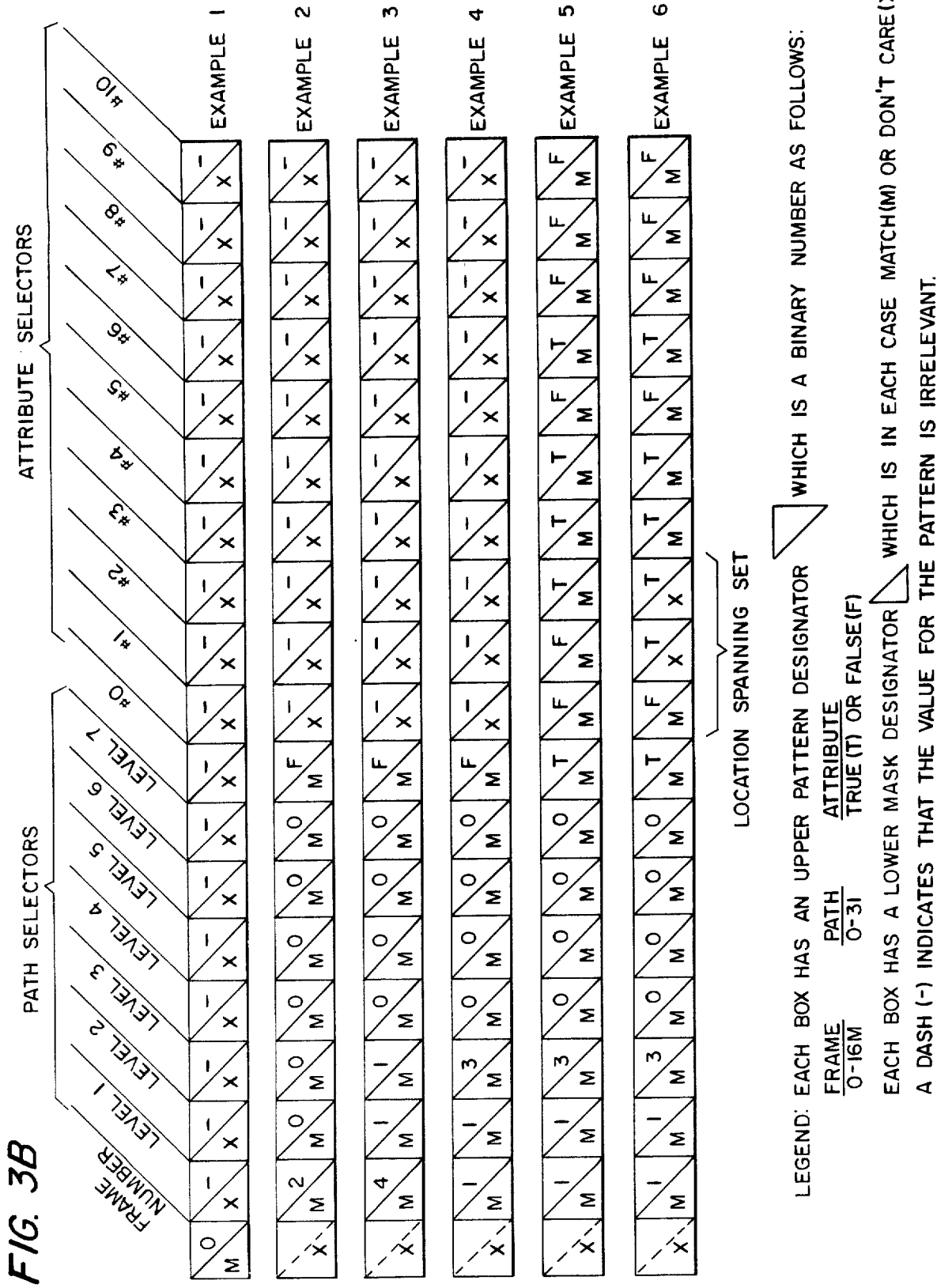
FIG. 3B gives examples of how path pattern d a allows hierarchical access to the FIG. 3A sample data base and attribute pattern data allows relational access.

There are six examples illustrated in FIG. 3B:

1. Shows the selection pattern for the root or screen number 0. There is an absolute match required for the first 24 bits representing the frame number 0. The rest of the path and attributes are ignored. The rest of the examples are selected by the path and attributes and, therefore, the frame number is a "don't care" (X). Screens, other than the root, are selected by frame number only in test mode.

2. Shows how to get to the second screen on level 1. The first level number is 2 and "match" (M). All the rest of the level numbers are 0 and "match" (M). The attribute number 0 is "false" (F) and "match" (M). The remaining attributes are "don't care" (X). This pattern uniquely specifies the screen desired.

3. Shows the selection of the twelfth screen from the left on level 3. To get to this from the root, you choose 4, then 1, and then 1 again. The selectors then are, frame number: "don't care" (X); level 1:4 and "match" (M); levels 2 and 3:1 and "match" (M) and the remaining levels: 0 and "match" (M). Attribute 0 is "false" (F) and "match" (M). The rest of the attributes are "don't care" (X). This screen has no further screens to be shown and this is indicated by the "T".

4. Shows how to select the third screen from the left in level 3 in the same manner as in example 3. This screen has 11 attribute selectors on it.

5-6. Shows how to get the screens descending from a chosen relational node. To get one of the screens that descend from this node attribute 0 is set to "true" (T) indicating that selection is to be made by attributes. The remaining attributes 1-10 are set "true" (T) or "false" (F) by answering the questions that appear on screen displayed at node 1,1,3. The selection path is the same as for example 4 except that attribute 0 is set "true" (T) and "match" (M) and attributes 1-10 are set to "match" (M). Any screen that has this path and these attributes then will be selected when the user initiates a "down-/in" operation to review data screens.

An additional property of the ReQueSt-DB system is the ability to formulate relational requests among the attribute selectors. This is done with a technique we coin called "spanning sets".

An example of this would be if the screen at node 1,1,3 is used to choose amongst a group of houses within a localized area. Attribute 1 then could be "in town A". Attribute 2 could be "in town B". Attribute 3 is "in town C". Attribute 4,5,6, and 7 could relate to the cost of the house. Attribute 8 is "has air conditioning". Attribute 9 is "has oil heat" and attribute 10 is "has more than 3 bedrooms".

Looking at example 5 in FIG. 3B we have selected to search for a house "in town C" (i.e. attribute 1 is "false" (F), 2 is "false" (F), and 3 is "true" (T)). Only screens that have attribute 3 true (i.e. houses "in town C") will then be displayed. Since attributes 1,2 and 3 are mutually exclusive (houses cannot be in two towns at the same time), a spanning set comprising attributes 1,2 and 3 has been identified for this example. Hence th is spanning set defines the mutually exclusive attributes 1,2 and 3, o n the relational screen at node 1,1,3.

When examining example 6 in FIG. 3B we note that a "true" (T) or select was made for both "in town B" and "in town C". The information that is really requested in example 6 is that "if the house is 'in town B' and matches the other attributes, I would like to look at it; OR if the house is 'in ton C' and matches the other attributes I would like to look at it." Quite obviously, no house can have both of these mutually exclusive location attributes true at the same time. The ReQueSt-DB system handles this situation by using the spanning set information encoded in the relational screens to know that if two or more items in a spanning set are selected, what is really wanted is none of the other items in the spanning set. Note that attributes 2 and 3 in example 6 are "don't care" (X), thus, the only selection is to exclude any houses that have attribute 1 "true" (T) and ignore whether attributes 2 and 3 are either "true" (T) or "false" (F). Therefore, we are not selecting for houses "in town B" or "in town C". We are simply excluding all houses that are əin town A".

This shows how the ReQueSt-DB system can make a relational inquiry using a combination of Boolean operators with hardware that would not normally allow this type of selection to be made.

6.6 The Keypad and Its Function

FIG. 4 shows a preferred keypad detail, of course it is not necessary that the keypad be arranged to look exactly as shown. In fact, the keypads available with various video games could be adapted for use with ReQueSt-DB and so, possibly, could be the remote control units used with ordinary televisions. There are, however, seven functions which the keypad must support.

The actual operation performed by the message control unit in response to a particular key's activation is dependent upon the type of screen that is being displayed. The "next" key means one operation in the context of a menu screen and another operation in the context of a data screen. What follows is a brief introduction to what actions are invoked by keypad entry in the context of each of the types of screens.

The "quit" button can be pushed at any time, it causes ReQueSt-DB to exit. The action could mean return to regular video TV reception or a similar alternative meaning "turn ReQueSt-DB off".

The "no", "don't care" and "yes" keys are used in the context of attribute screens. Depressing the "no" key for a particular attribute indicates that you wish data screens with that attribute to be excluded. If an attribute is central air conditioning in the context of a housing request attribute screen, depressing "no" means that you do not wish to have ads displayed which describe houses that have central air conditioning. The "yes" key selects the attribute. As in the previous case, selecting "yes" for the air conditioning attribute would mean that you wanted ads for houses with air conditioning to be shown. The "don't care" key is used when it doesn't matter to you whether the attribute is true or false.

The input from the "yes", "no", and "don't care" keys is used by the receiver unit to set up the selector masks for attributes. In the attribute flag set for a relational request, there is a bit corresponding to each attribute shown on a relational screen. (There are up to 31 attributes on a relational screen). Depressing "no" sets the corresponding attribute selector bit to false. Depressing "yes" sets the corresponding attribute selector bit to true and, for either of these cases, sets the "match/don't care" mask bit which corresponds to this attribute to "match". Depressing "don't care" sets the corresponding attribute bit in the "match/don't care" mask to "don't care". The state of the corresponding selector bit is irrelevant in this last case.

There are three different actions associated with the "next" key depending on whether the displayed frame is that of a menu, relational or data screen. If the screen is a menu screen, then depressing the "next" key moves the cursor to the next cursor location. Depressing the "next" key will cause the cursor to move cyclically among the cursor positions on the screen and thus, point in turn to each of the possible menu items on the screen.

On relational screens the "next" key tabs to the next attribute. Attribute values are either "yes", "no", "don't care" or "undefined". When a relational screen first appears, all of the attributes are set to "undefined". The default condition which corresponds to "undefined" is the "don't care" condition. However, "don't care" and "undefined" are not equivalent. If the "next" key is depressed when the attribute flag is "undefined", the value associated with the attribute will be "no". In all other cases the "next" key causes the cursor to tab to the next position or attribute without changing the current value.

For data screens the "next" key has slightly different semantics associated with it. If you are making relational queries or if you are examining multiple frames for the same query, then the "next" key gets the next data screen with the same attributes or the next data screen of a multi-screen display.

The "up/out" and "down/in" keys are used to maneuver among the levels within the data base. The "down/in" key is used to select the next level below the current level display, if the current display is a menu screen. If the current display is an attribute screen, then searches are made on the data base for frames which have the appropriate path and selector information.

The "up/out" key allows the user to navigate to higher levels in the data base. It simply retraces the hierarchical path that was first selected using the "down/in" key. The "up/out" key allows you to retrace your steps.

6.7 Data Format for the Serial Data Base

Figure 5A:
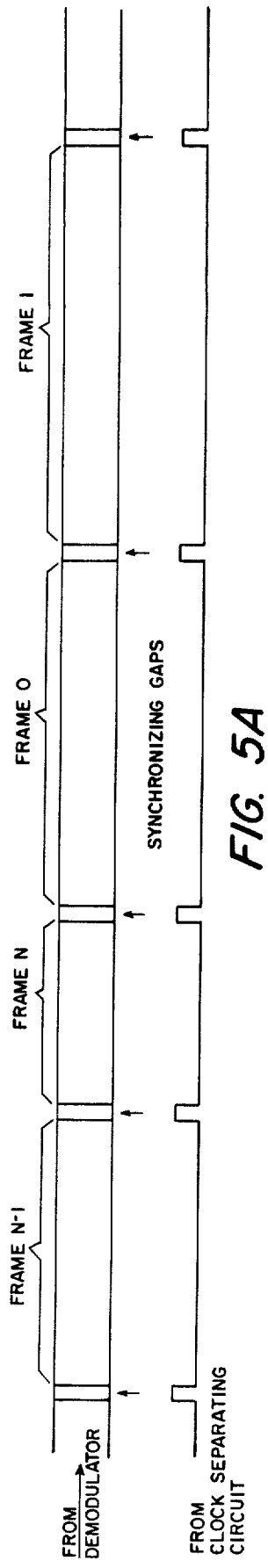
FIG. 5A, FIG. 5B, and FIG. 5C illustrate the data structure for the cyclically retransmitted messages (i.e. frames or data packs) on the serial transmission line.
Figure 5B:
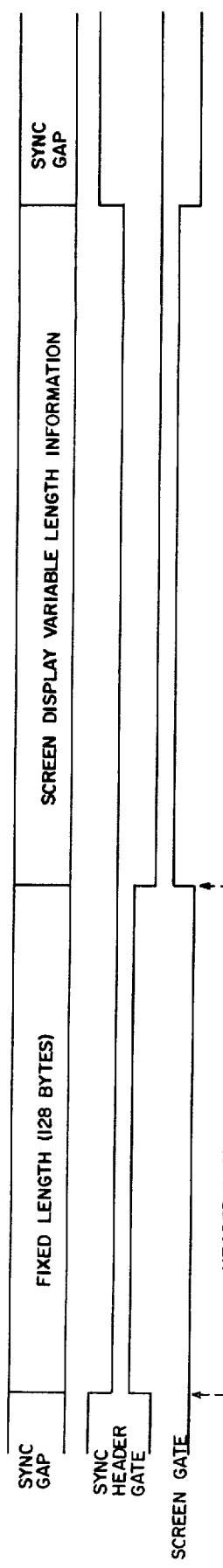
Figure 5C:
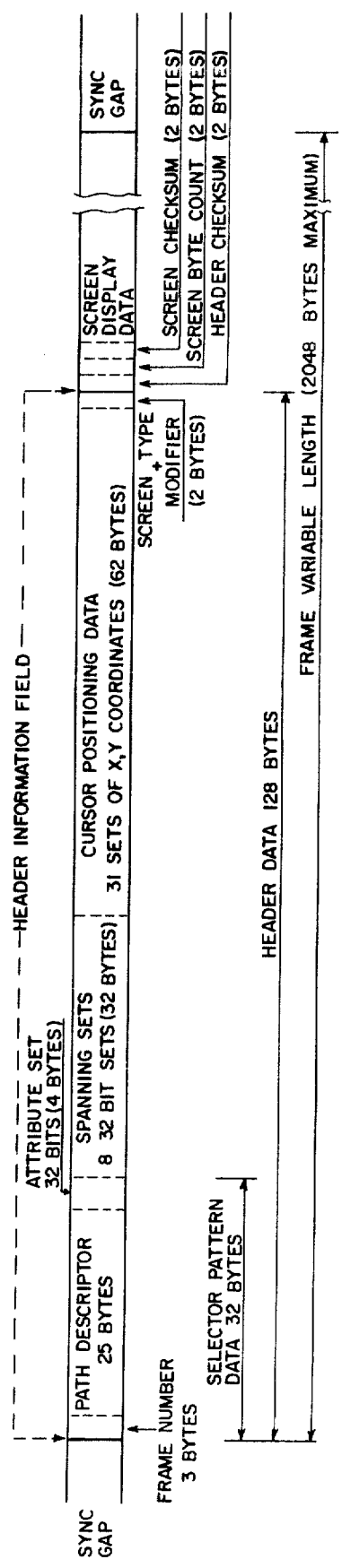

FIG. 5A, FIG. 5B and FIG. 5C illustrate the data structure on the serial transmission line of a ReQueSt-DB system. The physical structure of these records is one following another, separated by a synchronizing gap, repeated indefinitely. The clock separation circuits in FIG. 2 will detect the synchronizing gap and emit a sync pulse to the rest of the circuitry, to indicate the separation of the frames of information.

A frame of information is composed of two parts: a heater that is a fixed length of 128 bytes, and screen information that is variable in length. In the preferred embodiment the maximum frame length is 2,048 bytes. (In actual use the maximum frame length will be set to be a convenient memory size for screen reception and displaying.) The header has in it the frame number, the path and attributes, the spanning sets, cursor positioning and screen type information.

The figure illustrates that the selector portion is only 32 bytes long. This means that screen pattern testing goes on during only a small portion of the time necessary to receive the whole screen. This allows the receiver processor to abort the acquisition of a screen before the frame is complete and set up for another frame.

Immediately following the header are six bytes of test information to determine if the transmission is correct. Then follows the screen data. The whole frame from synchronizing pulse to synchronizing pulse is captured in a buffer RAM and any bit of data within it may be examined by the receiver processor.

6.8 Screen Capturing Electronics

FIG. 6 is a functional diagram of the screen capturing hardware. The RF demodulator provides data, clock, and sync pulses. The receiver microprocessor can store pattern information in the pattern storage RAM (operation 0), can store mask information in the mask RAM (operation 1), can read information from the frame storage RAM by storing the address to be read in the two address latches and reading the data from the data latch (operations 3, 4, and 7).

Several status bits are available to the receiver processor. Bit 0 is true if a go command has been issued by the receiver processor and the device is waiting for the end of a sync pulse to start operation. At the end of the sync pulse the bit counter circuit counts the data bits as they are acquired. Every eight data bits will be formed into a byte and stored in the frame storage RAM, and the address to the pattern, mask, and frame storage RAMs will be incremented. After the first 32 bytes have been processed, status bit 1 is set. At this point, the processor may read the frame storage RAM without disturbing the capturing of information. This is advantageous since more than one screen may satisfy a particular request, requiring the comparison of the numbers of previously captured frames to the current frame number (i.e. the first 3 bytes of the pattern) and abort if there is a match. If a screen match has been found, bit 2 is set true after 32 bytes. Therefore, a valid screen will be present if status bits 1 and 2 are both true.

To catch requests that cannot be satisfied, the receiver reads the frame number of the first frame that passes when a search is initiated. When this number is detected again the complete data base has been checked out and a "not found" message is displayed.

Bit 3 reflects the header gate; bit 4 the status of the screen gate; and bit 5 signifies operation complete. This stops the acquisition of further frames until either an abort command or a go command is executed by the receiver processor.

To read the frame storage RAM, the necessary address is stored in the address latches. When the high address latch is written into, the address multiplexor on the frame storage will select the address latches. The data from that address will appear at the output of the frame storage RAM and be latched into the data output latch which is then read by the receiver processor. This is necessary because the data from the transmission network is asyncronous with respect to the microprocessor and thus will not wait for the microprocessor to do something. Therefore, it is only possible to read the frame storage RAM in between times that bytes are written to the frame storage RAM from the data shift register.

The pattern storage RAM and the mask storage RAM may only be written into after the operation has been aborted or completed and before a go is issued. The address multiplexor for the mask and pattern storage RAM and select addresses from the receiver processor to allow access to these two areas. Otherwise, during operation the mask storage and pattern storage RAMs are not available to the receiver processor.

DISCUSSION OF THE PROTOTYPE PROGRAMS

In order to prove the concepts of the ReQueSt-DB system prior to the construction of a hardware prototype system, the logic and user interface portions were built and debugged with computer programs on a general purpose minicomputer. The programs are written in ANSI-Pascal and are self-explanatory to one skilled in software and have been deposited with the U.S. Patent and Trademark Office.

There are two programs. The first called "Data Enter" takes a textual representation of a ReQueSt data base and maps it into an internal structure which is a sequential file of frames with properly encoded headnotes and display data. A listing of the input file is attached to the programs.

The second program called ReQueSt supports the keypad and display interaction while repeatedly scanning the sequential file output by the first program. It thus forms a complete, easily understood model of the preferred embodiment.

We claim:

1. An information retrieval method from broadcast information which supports both hierarchical and relational access to said broadcast information by one or more receiving units, comprising the steps of:
   A. defining items of information having plural characteristic elements within frames and collecting said frames, wherein each frame further comprises a fixed-length digitally encoded header portion and a variable-length digitally encoded screen information portion, wherein said header portion comprises a path descriptor and an attribute descriptor for each frame; and
   B. forming a serial data base of said frames; and
   C. broadcasting said serial data base in a sequential and repetitive fashion to a plurality of receiving units; and
   D. defining those frames desired at a receiving unit by there generating a desired pattern selector and a desired mask selector, each comprised of separate fields of digitally encoded information elements and then scanning the header portion of each frame as it is being serially received at said receiving unit, and
   E. selecting frames by comparing, in an elementwise fashion, for a match of the path and attribute descriptor portions of each frame header with the previously generated, desired pattern selector according to the conditions imposed by the corresponding elements of the previously generated, desired mask selector; and
   F. grabbing selected frames and generating a graphical or alphanumeric video display of the screen information for the said frame.

2. The method according to claim 1, wherein said step (A) of defining further comprises the step of digitally encoding, as a relational frame, those of said plural characteristic elements which are mutually exclusive characteristic elements (within data frames having the same path descriptor as said relational frame) and ordering said mutually exclusive characteristic elements into a set of sub-sets defined as spanning sets and further said step (E) of selecting further comprises the step of an elementwise comparison of elements within a frame headnote portion against said desired mask attribute selector elements, wherein a given frame is selected if all the path descriptor elements of its headnote portion are matched and also for each mutually exclusive element of a given spanning set within said attribute descriptor headnote portion there is a corresponding mask element set to DON'T CARE (X) for each attribute selected as True (T).

3. The method according to claim 1, wherein said step (A) of defining a pattern path descriptor further comprises the step of digitally encoding a plurality of path level values in each frame headnote, wherein the zero level has no attributes or path values and is selected by a unique frame value alone and each succesive path level value is selectable, in Step E, from a choice of descendants which are digitally encoded in the headnote of each frame.

4. The method according to claim 1, wherein said step (E) comprises a bit serial comparison for equality between all elements of a fixed bit length pattern descriptor portion of each frame's headnote and corresponding bits representing the elements of the desired pattern selector for which corresponding bits representing the elements of the desired mask selector are digitally encoded as MATCH (M).

5. The method according to claim 1, wherein said step (A) further comprises digitally encoding the attribute descriptor portion of each frame headnote as a plurality of bits sets to True (T) or False (F) and said comparison step (E) further comprises selecting a given frame if all attribute descriptor bits of that given frame, have the same value as the corresponding attribute selector bits or, if any descriptor bit of that frame does not have the same value as the corresponding attribute selector bit, then a mask designator bit corresponding to that non-matching descriptor bit digitally had been encoded as DON'T CARE (X).

6. A receiver unit operable to receive the broadcast of a cyclically repeated data base, and support both hierarchical and relational information retrieval access to said broadcast data base, said receiver unit comprising:

A. means to receive digitally encoded broadcast signals representing serially presented discrete frames of information said frames being comprised of data frames and relational frames, each data frame having a plurality of characteristics and each relational frame comprising a digital encoding of the characteristics of a given level of data frames, wherein subsets of those characteristics, which are mutually exclusive, are grouped and digitally encoded as a spanning set in each relational frame, both types of frames having a fixed-length digitally encoded header portion and a variable length digitally encoded screen information portion; and B. means to select desired data frames of said broadcast according to a hierarchical and relational access which further comprises scanning means to read the header portion of each frame as it is received and grab those frames which meet the criteria established by a selection means;

C. said selection means further comprising a pattern processing means to digitally encode a desired pattern selector to be compared against each frame header portion by an Exclusive OR means and also a mask processing means to digitally encode a desired mask selector separately to be compared against the output of the Exclusive OR means by an Inclusive OR means, thereby to select, for display, a given frame only if a pattern descriptor portion of the header portion of that frame matches the pattern selector according to the further conditions as digitally encoded in the mask selector.

7. A receiver unit according to claim 6, wherein each data and relational frame fixed-length header portion further comprises a path descriptor and an attribute descriptor and, for a given relational frame, each of said spanning sets encoded therein further comprises a grouping of elements representing the mutually exclusive characteristics within all data frames having the same path descriptor as said relational frame, wherein said pattern processing means further comprises means to digitally encode said pattern selector as a desired path value and those characteristics of all data frames at said path value which the user wishes to be TRUE (T), and said mask selector means further comprises means to digitally encode said mask selector with a Match(M) value or a DON'T CARE(X) value which is compared against the digitally encoded value for each attribute descriptors in a frames headnote wherein, further, said mask selector means is operable to select a given data frame if the path descriptor portion of the headnote of that data frame is matched and also for each mutually exclusive element of a given spanning set of said frame attribute descriptor there is a corresponding mask element set to DON'T CARE(X) for each attribute selected by said selection means as True (T).

8. A receiver unit according to claim 7, wherein said selection means further comprises a keypad input device further comprising a NEXT input operable to grab and hold for review the information portion of additional selected frames as serially received which meet the match conditions established by said selection means.

9. A receiver unit according to claim 8, wherein said keypad input device further comprises DON'T CARE, YES, NO inputs which, for the choices presented by a given grabbed relational frame, are operable to set corresponding attribute selector and mask selector elements, wherein for a DON'T CARE input the corresponding mask selector element is set to DON'T CARE (X), and for a YES or NO input the corresponding pattern attribute selector element respectively is set to True (T) or False (F), wherein further for each True (T) in the attribute selector which is a member of a spanning set the corresponding mask selector element is set to DON'T CARE (X).

10. A broadcast-based information retrieval system which supports both hierarchical and relational access to a serial data base by one or more receiving units, said system comprising:

A. assembly logic means to define items of information having plural characteristics within frames, wherein each frame further comprises a fixed-length digitally encoded header portion and a variable-length digitally encoded screen information portion, wherein the header portion of each frame comprises a pattern descriptor which further comprises a path descriptor and an attribute descriptor; and B. head-end processor means to collect said frames and form a serial data base of said frames;

C. modulator means to broadcast said serial data base in a sequential and repetitive fashion to a demodulator means at one or more receiving units, each comprising receiver logic means and signal synthesis means;

D. said receiver logic means operable to define a pattern selector and a mask selector to match an hierarchical path descriptor and a relational attribute descriptor by generating a desired pattern selector and a desired mask selector, each comprised of separate fields of digitally encoded information elements, at that receiving unit and then perform an elementwise scanning of the pattern descriptor of each frame as it is being serially received, and then grabbing a frame if there is a match of the path and attribute descriptor portions of that frame header to the defined pattern selector, according to the further conditions imposed by the corresponding elements of said defined mask selector;

E. said signal synthesis means operable to generate a graphical or alphanumeric video display of the screen information portion of a frame which has been grabbed at that receiving unit.

11. A system according to claim 10, wherein said receiver logic means further comprises a frame grabbing means to selectively grab a frame for display based upon a real-time scanning of the pattern descriptor of that frame, during the time said frame appears at that receiving unit during said sequential broadcast of the serial data base.

12. A system according to claim 10, wherein each frame pattern descriptor further comprises a binary number defining the path location for a given frame and a set of binary attribute values which are set either as True (T) or False (F) for each of a plurality of attribute characteristics descriptive of the information portion of said given frame.

13. A system according to claim 10, wherein said receiver logic means further comprises a pattern processing means to digitally encode a desired pattern selector to be compared against each frame header portion by an Exclusive OR means and also a mask processing means to digitally encode a desired mask selector separately to be compared against the output of the Exclusive OR means, thereby to instruct the signal synthesis means to display a given frame only if the pattern descriptor portion of the header of that frame matches the pattern selector according to the further conditions as digitally encoded in the mask selector.

14. A system according to claim 10, wherein each data and relational frame fixed-length header portion further comprises a path descriptor and an attribute descriptor and, for a given relational frame, there is digital encoding of the characteristics of a given level of data frames, wherein subsets of those characteristics which are mutually exclusive are grouped and digitally encoded as spanning sets, wherein said mask attribute selector means grabs a given data frame if the path descriptor portion of the headnote of that data frame is matched and also for each element of a given spanning set of said frame attribute descriptor there is a corresponding mask element set to DON'T CARE(X) for each attribute selected by said selection means as True (T).

15. A system according to claim 14, wherein said receiver logic means comprises a keypad input device comprising a NEXT input operable to grab and hold for review the information portion of additional selected frames as serially received which meet the match conditions established by said selection means.

16. A system according to claim 15, wherein said keypad input device further comprises DON'T CARE, YES, NO inputs which, for the choices presented by a given grabbed relational frame, are operable to set corresponding attribute selector and mask selector elements, wherein for a DON'T CARE input the corresponding mask selector element is set to DON'T CARE (X), and for a YES or NO input the corresponding pattern attribute selector element respectively is set to True (T) or False (F), wherein further for each True (T) in the attribute selector which is member of a spanning set the corresponding mask selector element is set to DON'T CARE (X).

* * * * *